US009120574B2

(12) United States Patent
Ligonniere et al.

(10) Patent No.: US 9,120,574 B2
(45) Date of Patent: Sep. 1, 2015

(54) PASSENGER SEAT (75) Inventors: Laurent Ligonniere, Paudy (FR);
Philippe Roy, Bourges (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 13/484,678

(22) Filed: May 31, 2012

(65) Prior Publication Data
US 2012/0306252 A1 Dec. 6, 2012

Related U.S. Application Data (60) Provisional application No. 61/491,376, filed on May 31, 2011.

(51) Int. Cl.
*B60N 2/00* (2006.01)
*B64D 11/06* (2006.01)
(52) U.S. Cl.
CPC .............. *B64D 11/06* (2013.01); *B64D 11/064* (2014.12); *B64D 11/0641* (2014.12)
(58) Field of Classification Search
USPC ................ 297/86, 95, 354.1, 354.12, 354.13, 297/344.1, 344.14, 344.15, 344.17, 328
See application file for complete search history.

(56) References Cited

U.S. PATENT DOCUMENTS

| | | | |
|---|---|---|---|
| 2,514,798 A | | 7/1950 | Rowe |
| 3,083,055 A * | | 3/1963 | Davis ....................... 297/344.17 |
| 4,944,555 A * | | 7/1990 | Brusasco ...................... 297/330 |
| 5,261,725 A * | | 11/1993 | Rudolph .................... 297/361.1 |
| 5,315,726 A * | | 5/1994 | Borenstein ........................ 5/618 |
| 5,429,415 A * | | 7/1995 | Meade ..................... 297/354.13 |
| 6,305,644 B1 * | | 10/2001 | Beroth ........................ 244/118.5 |
| 6,439,636 B1 * | | 8/2002 | Kuo .......................... 296/65.09 |
| 6,494,536 B2 * | | 12/2002 | Plant ........................ 297/284.11 |
| 6,769,739 B2 * | | 8/2004 | Salzer et al. .............. 297/354.13 |
| 6,808,234 B2 * | | 10/2004 | Bauer et al. .............. 297/354.12 |
| 7,182,404 B2 * | | 2/2007 | Laurent .................... 297/411.39 |
| 7,318,625 B2 * | | 1/2008 | Roither .................... 297/362.11 |
| 7,523,888 B2 * | | 4/2009 | Ferry et al. ................. 244/118.6 |
| 7,600,817 B2 * | | 10/2009 | Kramer et al. ........... 297/362.13 |
| 7,665,693 B2 * | | 2/2010 | Bettell ....................... 244/122 R |
| 8,403,415 B2 * | | 3/2013 | Lawson ........................ 297/329 |
| 2010/0032994 A1 | | 2/2010 | Lawson |

FOREIGN PATENT DOCUMENTS

DE 10018828 C1 10/2001
WO 0181172 A1 11/2001

OTHER PUBLICATIONS

International Search Report and Written Opinion dated Nov. 14, 2012 in Application No. PCT/IB2012/001151.
International Preliminary Report on Patentability dated Dec. 12, 2013 in Application No. PCT/IB2012/001151.

* cited by examiner

*Primary Examiner* — Jose V Chen
(74) *Attorney, Agent, or Firm* — Kilpatrick Townsend & Stockton LLP; Dean W. Russell; Tiffany L. Williams (57) ABSTRACT Described are passenger seats including a lower frame comprising a pair of supports, a seat pan adjustably coupled to the pair of supports via a coupling system, and a rear leg coupled to the lower frame, wherein the rear leg includes an extension component that is configured to adjust a height of the rear leg. The passenger seat may be adjusted into a bed position by compressing the rear leg, adjusting the seat pan into a forward position relative to the lower frame, and reclining the seat back until the seat back is substantially proximate the lower frame.

12 Claims, 4 Drawing Sheets

PASSENGER SEAT

CROSS REFERENCE TO RELATED APPLICATIONS

This application is related to and claims priority benefits from U.S. Provisional Application Ser. No. 61/491,376, filed on May 31, 2011, entitled PREMIUM SEAT OFFERING A LOW PROFILE FULL FLAT BED POSITION ("the '376 application"). The '376 application is hereby incorporated in its entirety by this reference.

FIELD OF THE INVENTION

The field of the invention relates to passenger seats or the like.

BACKGROUND

Many common carriers, such as passenger airlines, bus lines, and train lines, include premium seats that offer a variety of seat positions from the most upright to a full flat or lie flat bed position. In an upright position, a bottom cushion of the seat is typically positioned at a height of approximately 15 to 19 inches from a vehicle floor. When the seat is transitioned to the bed position, the bottom cushion is still approximately 15 to 19 inches from the vehicle floor or slightly lower.

Because these seats are often placed in rows of at least two seats, an access path must be provided for passengers seated in a non-aisle seat. Conventionally, the access path is provided by leaving access space between the seat and the next forward seat when the seat is in the full flat or lie flat bed position. As a result, a greater distance between seats is required, thus reducing the total number of seats that may be placed in a vehicle cabin. As a result, it may be desirable to provide a seat with a full flat or lie flat bed position that does not require additional access space between the seat and the next forward seat.

SUMMARY

Embodiments of the present invention include a passenger seat comprising a lower frame having a pair of supports, a seat pan adjustably coupled to the pair of supports via a coupling system, and a rear leg coupled to the lower frame, wherein the rear leg comprises an extension component that is configured to adjust a height of the rear leg. A seat back may be pivotally coupled to the seat pan. Each support may further comprise a forward end and an aft end, and the seat pan may further comprise a pair of projections, wherein the pair of projections are coupled to the pair of supports via the coupling system that is configured to allow the seat pan to translate between the forward end and the aft end of each support.

According to certain embodiments, the passenger seat is in a bed position when the rear leg is compressed, the seat pan is in a forward position relative to the lower frame, and the seat back is rotated to a position proximate the lower frame. The passenger seat may be positioned to form approximately a 3 degree angle relative to a vehicle floor in the bed position. In these embodiments, the passenger is in a sitting position when the rear leg is extended, the seat pan is in an aft position relative to the lower frame, and the seat back is rotated to a sitting position.

In some embodiments, the extension component may comprise at least two pair of segments pivotally coupled to one another in an accordion arrangement or may comprise a rack and pinion actuator. The coupling system may further comprise a pair of tracks positioned adjacent an upper portion of each support and a pair of projections extending from an aft end of the seat pan, each projection comprising a sprocket coupled to the corresponding track.

The passenger seat may be adjusted into a bed position by compressing the rear leg, adjusting the seat pan into a forward position relative to the lower frame, and reclining the seat back until the seat back is substantially proximate the lower frame. The seat pan may also rotate forward. In these embodiments, a width of the lower frame may not extend past a width of the seat back.

Certain embodiments of the present invention may include an aircraft comprising a plurality of passenger seats, each passenger seat comprising a bed position that is proximate a vehicle floor, wherein the height of the bed position is configured so that a passenger may step over the passenger seat in the bed position.

DETAILED DESCRIPTION

Embodiments of the invention provide seats with a range of adjustment options. While the seats are discussed for use with aircraft, particularly as passenger seats, they are by no means so limited. Rather, embodiments of the seats may be used with any type of vehicle or otherwise as desired.

FIGS. 1-5 illustrate embodiments of a seat 10. In some embodiments, the seat 10 comprises a seat pan 12, a seat back 14, a lower frame 16, and a rear leg 18. The seat pan 12, the seat back 14, the lower frame 16, and/or the rear leg 18 may be formed of materials including but not limited to aluminum, stainless steel, other metallic materials, composite materials, or other similar materials.

The seat pan 12 may include a frame 20. The frame 20 may have a substantially rectilinear shape or any other suitable configuration that will provide sufficient support for a passenger seated in seat 10. The frame 20 may include a pair of projections 22 that extend from an aft end 24 of the seat pan 12.

The seat back 14 may include a frame 26. The frame 26 may have a substantially rectilinear shape or any other suitable configuration that will provide sufficient support for a passenger seated in seat 10. The frame 26 may include a pair of projections 28 that extend from a lower end 30 of the seat back 14.

Figures 2, 3:
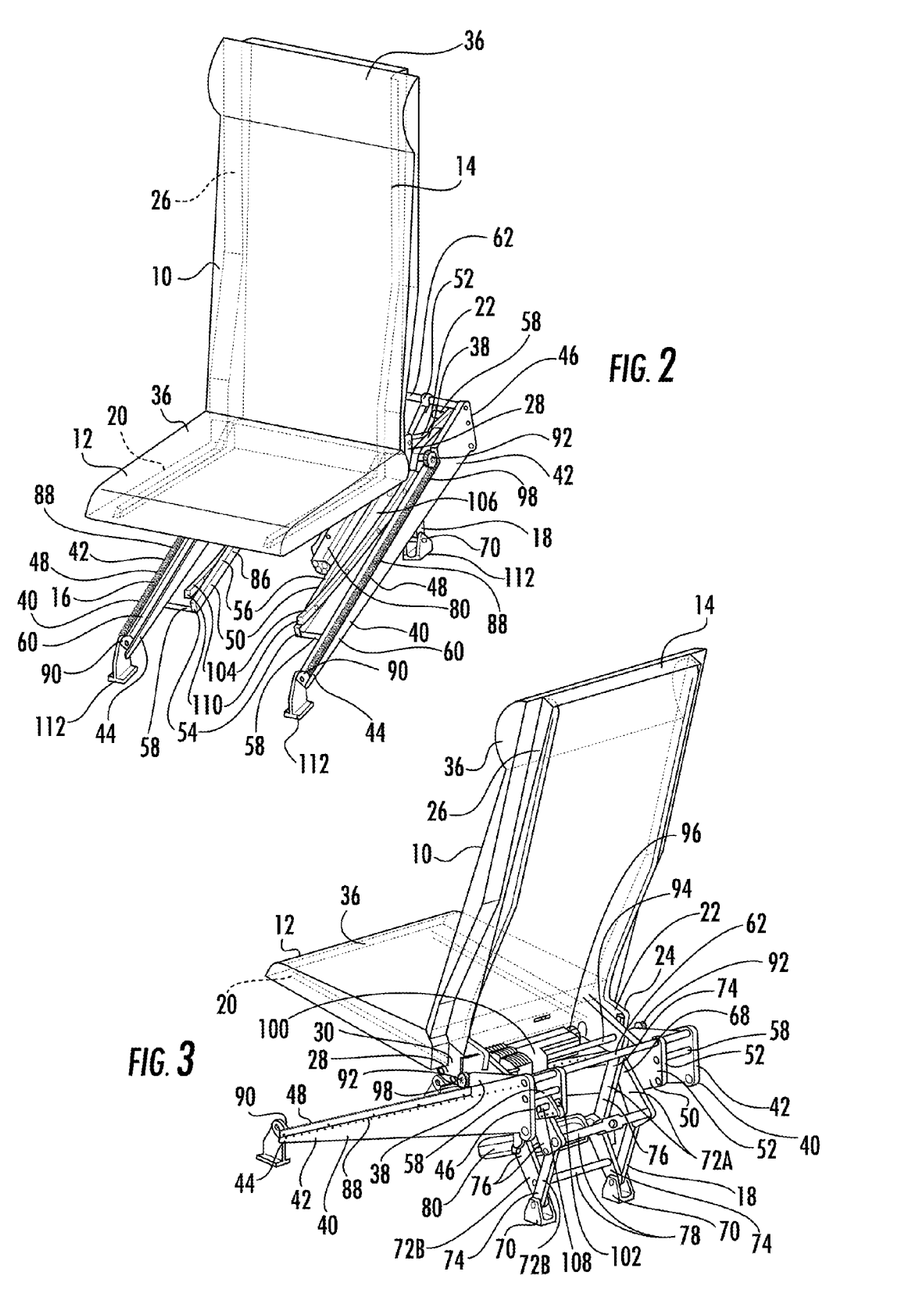
FIG. 2 is a front perspective view of the passenger seat of FIG. 1 in a sitting position.
FIG. 3 is a rear perspective view of the passenger seat of FIG. 1 in a sitting position.

In certain embodiments, the seat back 14 may be pivotally coupled to the seat pan 12. In these embodiments, the two pairs of projections 22, 28 may be pivotally coupled via a pivot bar or other pivotal coupling mechanism inserted through the projections 22, 28 to allow the seat back 14 to pivot relative to the seat pan 12 (as best illustrated in FIG. 3). In some embodiments, at least one actuating mechanism may be coupled to the seat back 14 and the seat pan 12. In certain embodiments, the actuating mechanism may be any suitable releasably locking mechanism including but not limited to a recline lock, a linear actuator, a gas spring, a mechanical spring, an electrical motor, or other similar devices.

The seat pan 12 and/or the seat back 14 may include a cushion 36 to provide additional comfort and support for a passenger seated in the seat 10. The covering of the cushion 36 may be formed of any suitable material including but not limited to textiles, woven or nonwoven fabrics, leather, synthetic materials, plastics, or other similar materials. The internal composition of the cushion 36 may include any suitable material that provides a comfortable resting location for a passenger, while providing a durable material that will withstand repeated usage. The type of internal cushion material includes but is not limited to viscoelastic materials, foam materials, honeycomb-shaped materials, cushioning materials, or other similar materials.

In certain embodiments, the seat pan 12 may be coupled to the lower frame 16 via a coupling system 38, which is described in greater detail below.

The lower frame 16 may comprise a pair of supports 40. In certain embodiments, each support 40 may comprise an outer wall 42 having a forward portion 44 and an aft portion 46. In these embodiments, the forward portion 44 may have a height that is less than the aft portion 46. As a result, an upper portion 48 that connects the forward portion 44 and the aft portion 46 may have an inclined surface that slopes downward in a forward direction. In certain embodiments, the downward forward slope may be included to compensate for a flight angle or nose-up attitude of an aircraft so that a bed position of the seat 10, described in more detail below, is approximately level for a passenger's use during flight. However, one of ordinary skill in the relevant art will understand that any suitable angle may be used as needed depending on the particular aircraft and/or whether a certain amount of incline is desired. Also, different aircraft may utilize different flight angles, thus changing the amount of angle needed to achieve an approximately level bed position for the passenger's use during flight. For the embodiments where the aircraft's flight angle is approximately 3 degrees and a level bed position is desired, the amount of downward forward slope may be approximately 3 degrees as measured relative to a vehicle floor when the seat 10 is in the bed position. However, one of ordinary skill in the relevant art will understand that any suitable amount of forward or aft slope may be included as needed to achieve the desired bed position.

In some embodiments, as shown in FIGS. 1-4, each support 40 may further comprise an inner wall 50 that is spaced apart from and coupled to the outer wall 42. In certain embodiments, the inner wall 50 also includes an aft portion 52, which may have a substantially similar configuration and proportions as the aft portion 46 of the outer wall 42.

The inner wall 50 may also comprise a forward portion 54. In these embodiments, the forward portion 54 may have a height that is less than the aft portion 52. As a result, an upper portion 56 that connects the forward portion 54 and the aft portion 52 may have an inclined surface that slopes downward in a forward direction. In some embodiments, the amount of forward slope of the upper portion 56 may be approximately the same or more than the amount of forward slope of the upper portion 48. However, one of ordinary skill in the relevant art will understand that any suitable amount of forward or aft slope may be included as needed to achieve the desired bed position.

In certain embodiments, the inner wall 50 may have a length that is less than the length of the outer wall 42. As a result, the forward portion 54 of the inner wall 50 may align with a portion of the outer wall 42 that is located aft of the forward portion 44. Alternatively, the aft portion 52 of the inner wall 50 may align with a portion of the outer wall 42 that is located forward of the aft portion 46. One of ordinary skill in the relevant art will understand that the inner wall 50 may have any suitable length or configuration needed to achieve the desired bed position.

In these embodiments, the aft portion 52 and the forward portion 54 of the inner wall 50 may be coupled to the outer wall 42 via at least one cross bar 58. In certain embodiments, the cross bar 58 is positioned between the aft portions 46, 52 of the two walls 42, 50. A second cross bar 58 may be positioned between the forward portion 54 of the inner wall 50 and a central portion 60 of the outer wall 42. The cross bars 58 may be welded, integrally formed, or otherwise joined to the walls 42, 50 via mechanical fasteners, such as bolts, rivets, screws, or other suitable fasteners. One of ordinary skill in the relevant art will understand that any suitable number and locations of cross bars 58 may be used to achieve the desired stability for the lower frame 16.

In certain embodiments, the supports 40 may not include the inner wall 50. In these embodiments, the outer wall 42 may comprise an aperture 120 shaped to separate the upper portion 56 from a lower portion 122. The lower portion 122 may have an inclined surface, a curved surface, a level surface, or any other suitable shape as needed to achieve the desired bed position.

The pair of supports 40 may also be coupled to one another to provide additional stability to the lower frame 16. In these embodiments, at least one cross bar 62 may pass through and/or couple to the aft portions 46, 52 of the walls 42, 50 of each support 40. The cross bar 62 may be welded, integrally formed, or otherwise joined to the walls 42, 50 via mechanical fasteners, such as bolts, rivets, screws, or other suitable fasteners.

The aft portion 46 of the outer wall 42, the aft portion 52 of the inner wall 50, and/or the cross bar 62 may be pivotally coupled to a rear leg 18. The rear leg 18 may comprise a pair of extension components 66, wherein each extension component 66 comprises an upper end 68 and a lower end 70. In certain embodiments, the extension component 66 may further comprise at least two pair of segments 72A, 72B, wherein each segment 72A, 72B comprises a first end 74 and a second end 76. In these embodiments, the first end 74 of each segment 72A are pivotally coupled to one another, wherein the pivot point corresponds to the upper end 68. Likewise, the first end 74 of each segment 72B are pivotally coupled to one another, wherein the pivot point corresponds to the lower end 70. The second end 76 of each segment of the pair of segments 72A is pivotally coupled to the second end 76 of each corresponding segment of the pair of segments 72B. As a result, all of the segments 72A, 72B are pivotally coupled to one another in a configuration that forms a parallelogram, commonly known as an accordion arrangement. The shape of the parallelogram may be adjusted by rotating each of the pair of segments 72A, 72B about the pivot points adjacent the ends 68, 70.

Thus, when the sizes of the angle formed between the segments 72A and the angle formed between the segments 72B are reduced, the shape of the parallelogram becomes more vertically elongated and the extension component 66 increases in overall height. As a result, the maximum height of the extension component 66 is achieved when the angle formed between the segments 72A and the angle formed between the segments 72B approaches 0 degrees and the segments 72A, 72B are substantially aligned in a vertical direction.

Conversely, when the sizes of the angle formed between the segments 72A and the angle formed between the segments 72B are increased, the shape of the parallelogram becomes more horizontally elongated and the extension component 66 decreases in overall height. The minimum height of the extension component 66 is achieved when the angle formed between the segments 72A and the angle formed between the segments 72B approaches 180 degrees and the segments 72A, 72B are substantially aligned in a horizontal direction.

The pair of supports 40 may also be coupled to one another to provide additional stability to the lower frame 16. In these embodiments, at least one cross bar 78 may couple to one of the segments of one of the extension components 66 and to the corresponding segment in the other extension component 66. For example, as shown in FIG. 3, one cross bar 78 may be positioned between the forward segments of the pair of segments 72B. A second cross bar 78 may be positioned between the aft segments of the pair of segments 72A. A third cross bar 78 may also be positioned between the forward segments of the pair of segments 72B, but closer to the second ends 76 of the segments 72B. In some embodiments, the cross bars 78 may be positioned adjacent the pivot points between the two pair of segments 72A, 72B. The cross bars 78 may be welded, integrally formed, or otherwise joined to the segments 72A, 72B via mechanical fasteners, such as bolts, rivets, screws, or other suitable fasteners. However, one of ordinary skill in the relevant art will understand that any suitable number and locations of cross bars 78 may be used to achieve the desired stability for the rear leg 18.

Figure 1:
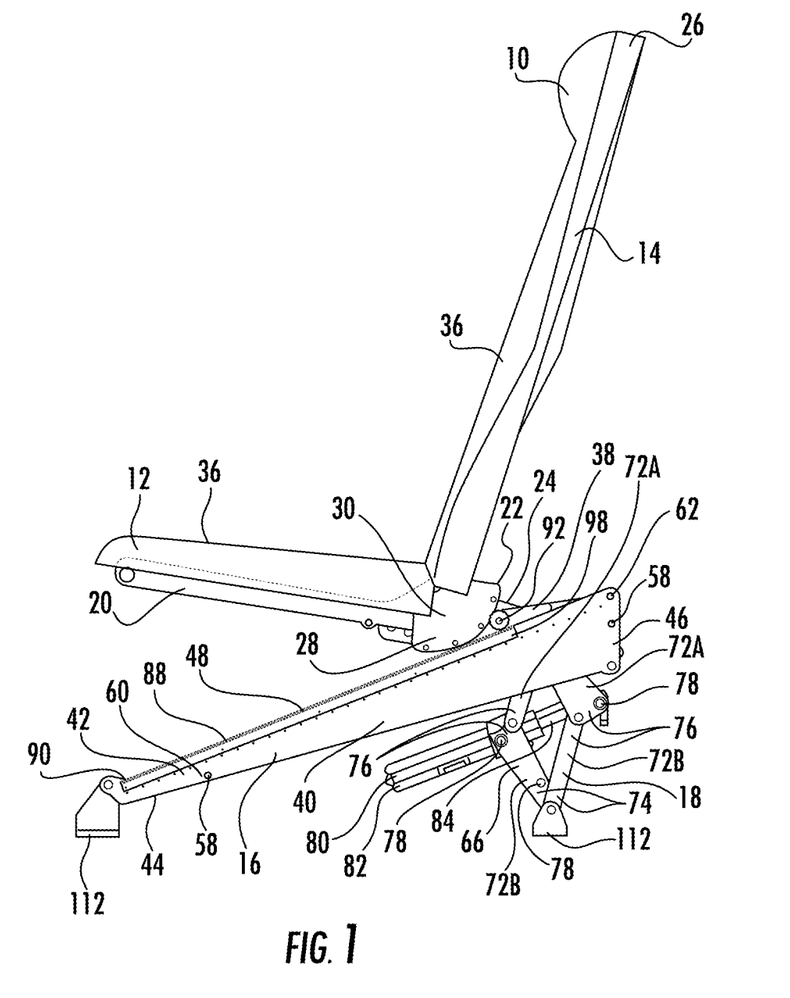
FIG. 1 is a side view of a passenger seat according to certain embodiments of the present invention.

In some embodiments, at least one actuating mechanism 80 may be coupled to the rear leg 18. In certain embodiments, as shown in FIGS. 1-3, the actuating mechanism 80 may be a locking gas spring 80 comprising a cylinder 82 and a piston 84. In other embodiments, other suitable types of actuating mechanisms may be used including but not limited to linear actuators, recline locks, mechanical springs, electrical motors, or other suitable mechanisms.

In some embodiments, as shown in FIGS. 1-3, the piston 84 may be coupled to the second cross bar 78 (which is coupled to the aft segments of the pair of segments 72A), and the cylinder 82 may be coupled to the third cross bar 78 (which is coupled to the forward segments of the pair of segments 72B). Any suitable mechanical fasteners may be used to couple the piston 84 and cylinder 82 to the cross bars 78 including but not limited to screws, bolts, rivets, or other suitable mechanical fastening devices. Through this coupling arrangement, the gas spring 80 is configured to apply a pulling force to increase the height of the extension components 66.

Figure 5:
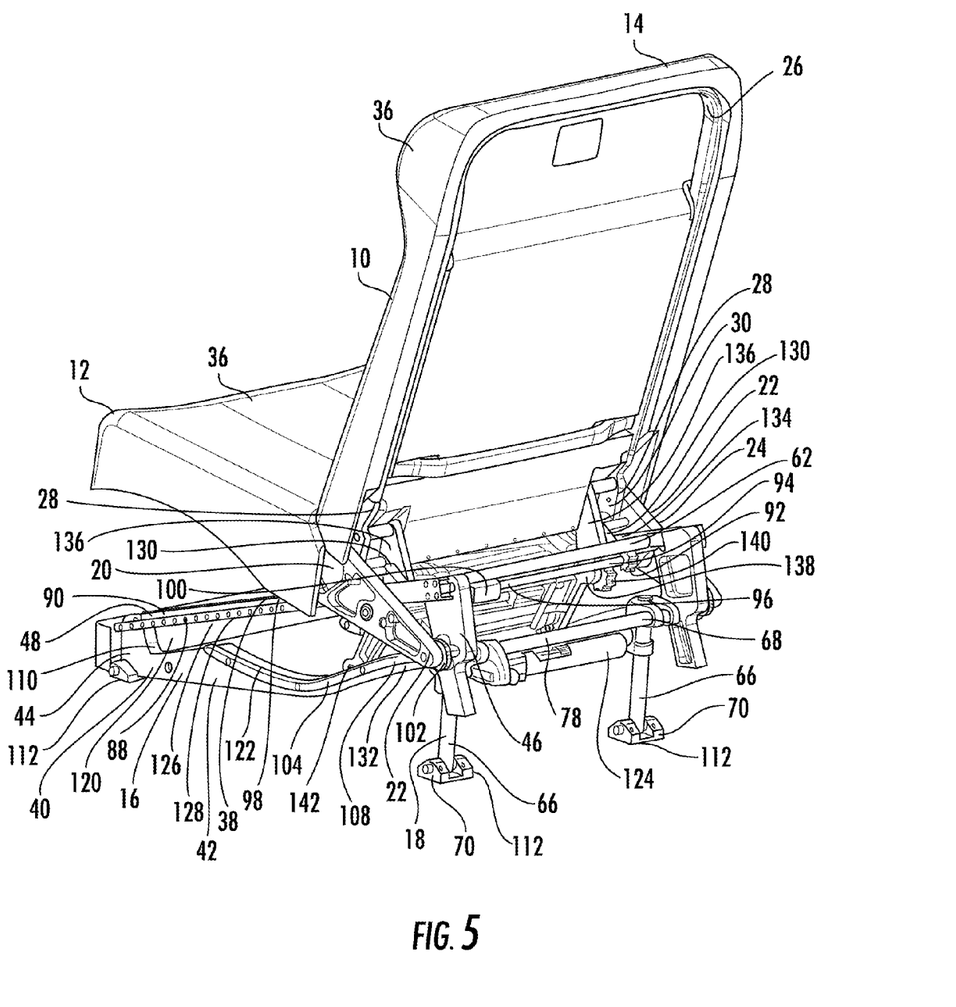
FIG. 5 is a rear perspective view of a passenger seat according to other embodiments of the present invention.

In some embodiments, as illustrated in FIG. 5, each extension component 66 may comprise any suitable releasably locking mechanism, such as a rack and pinion actuator. Each extension component 66 may also comprise a pneumatic shaft, a recline lock, a linear actuator, a gas spring, a mechanical spring, an electrical motor, or other similar devices. In these embodiments, each extension component 66 may be centrally coupled to a common controller 124 so that the two extension components 66 are configured to operate together. Each extension component 66 may also be coupled to one another via one or more cross bars 78. The common controller 124 may also be coupled to the cross bar 78.

In certain embodiments, the upper end 68 of each extension component 66 may be coupled to the inner wall 50 of each support 40. In other embodiments, as shown in FIG. 5, the cross bar 78 may pass through and/or couple the upper end 68 of each extension component 66 to the outer wall 42. The cross bar 78 may be welded, integrally formed, or otherwise joined to the outer wall 42 via mechanical fasteners, such as bolts, rivets, screws, or other suitable fasteners. In some embodiments, the upper end 68 of each extension component 66 may be coupled to the outer wall 42, the cross bar 62, or any other suitable location on the lower frame 16.

As illustrated in FIGS. 1-5, the coupling system 38 that couples the seat pan 12 to the lower frame 16 may comprise a rack and pinion or interlocking sprocket design (i.e., the use of a wheel having radial projections that engage a track, chain, or other perforated or indented material). In other embodiments, the coupling system 38 may be a linear actuator, gas spring, recline lock, mechanical spring, electrical motor, or other suitable mechanisms. In the embodiments shown in FIGS. 1-5, at least one pair of tracks 88 may be coupled to the pair of supports 40. Specifically, each track 88 may be positioned along at least a portion of the upper portion 48 of the outer wall 42 of each support 40. In the embodiments illustrated in FIG. 5, a pair of tracks 126 may be positioned on an interior surface 128 of each upper portion 48. In other embodiments, one or both tracks 88, 126 may be positioned along at least a portion of the upper portion 56 of each inner wall 50 or other suitable surface.

In certain embodiments, at least one pair of sprockets 92 may be coupled to the pair of projections 22 of the seat pan 12. In some embodiments, each sprocket 92 may be positioned adjacent an end 94 of an axle 96 that passes through projections 22 of the seat pan 12. Each sprocket 92 is then coupled to the corresponding track 88 and/or track 126.

In some embodiments, as shown in FIG. 5, the frame 20 may comprise a second pair of projections 130 that extend from the aft end 24 of the seat pan 12 and are spaced apart from the projections 22 so that each projection 22 is positioned adjacent an exterior surface 132 of the outer wall 42, and each projection 130 is positioned adjacent an interior surface 134 of the outer wall 42. In these embodiments, the axle 96 may pass through projections 22 and 130 at a position that is below the upper portion 48 (i.e., passing through the aperture 120 in the outer wall 42). As a result, each sprocket 92 may be positioned proximate the track 126 so that the each sprocket 92 may be coupled to the corresponding track 126.

In these embodiments, the frame 26 may further comprise a second pair of projections 136 that extend downward from the lower end 30 of the seat back 14 and are spaced apart from the projections 28 so that each projection 28 is positioned adjacent the corresponding projection 22 and each projection 136 is positioned adjacent the corresponding projection 130. In these embodiments, each projection 28 may be integrally formed with the frame 26 and coupled to the corresponding projection 136, thus allowing the seat back 14 to pivot relative to the lower frame 16. The projection 136 may be configured to extend downward so that a lower end 138 is positioned below the upper portion 48. In certain embodiments, a pair of sprockets 140 may be coupled to the lower ends 138 of the pair of projections 136 and may be positioned proximate the track 126 so that each sprocket 140 may be coupled to the corresponding track 126.

However, one of ordinary skill in the relevant art will understand that any suitable location and/or coupling arrangement between the sprockets 92, 140 and the tracks 88, 126 may be used as needed to achieve the desired bed position.

Rotation of the sprockets 92 and/or sprockets 140 in a forward direction transitions the seat pan 12 to a forward end 90 of the track 88 and/or track 126, and rotation of the sprockets 92 in an aft direction transitions the seat pan to an aft end 98 of the track 88 and/or track 126. In some embodiments, as shown in FIG. 3, a motor 100 is coupled to the axle 96, which in turn provides the force necessary to turn the sprockets 92 in the desired direction.

Figure 4:
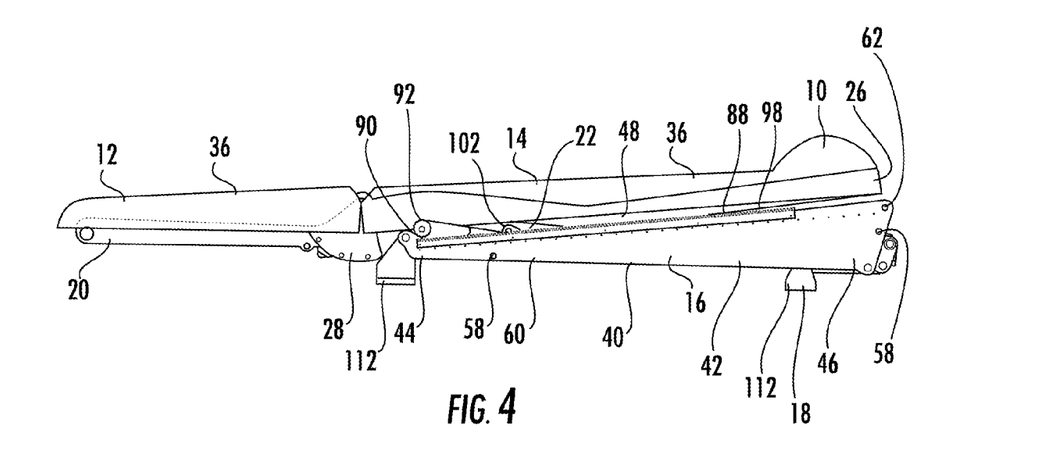
FIG. 4 is a side view of the passenger seat of FIG. 1 in a bed position.

In some embodiments, the angle of the seat pan 12 may also be adjusted relative to the lower frame 16. As shown in FIGS. 3-5, a wheel 102 may be coupled to each projection 22 of the seat pan 12 and may be configured to couple with a track 104. In some embodiments, as shown in FIGS. 1-4, the track 104 may be positioned on an exterior surface 106 of the inner wall 50 of the lower frame 16. In other embodiments, as shown in FIG. 5, the track 104 may be positioned on the lower portion 122 of the outer wall 42. The track 104 may also be positioned on an interior surface 86 of the inner wall 50 or any other suitable location.

In these embodiments, an aft end 108 of the track 104 is configured so that each wheel 102 is lower than the corresponding sprockets 92 in the sitting position. Because the sprockets 92 are coupled to the projections 22 in a location that is forward of the location where the wheels 102 are coupled to the projections 22, the lower aft position of the wheels 102 causes the seat pan 12 to angle downward in an aft direction, which is a desirable orientation for sitting.

In contrast, a forward end 110 of the track 104 is configured so that each wheel 102 is higher or approximately level with each sprocket 92, which in turn positions the seat pan 12 with a slight angle downward in a forward direction or a substantially level orientation in the bed position, which is a desirable orientation for reclining or sleeping.

In some embodiments, the track 104 may be configured as a slot through which the wheel 102 is inserted and coupled thereto. In these embodiments, the track 104 may serve to couple the seat pan 12 to the lower frame 16 in addition to or as an alternative to serving as a tilt adjustment mechanism.

In these embodiments, the angular adjustment of the seat pan 12 may be controlled via the motor 100 that adjusts the position of the sprockets 92. However, in other embodiments, the seat pan tilt adjustment may be controlled separately via a similar interlocking sprocket design, linear actuator, gas spring, recline lock, mechanical spring, electrical motor, or other suitable mechanisms.

In some embodiments, as shown in FIG. 5, each projection 136 may be configured to extend downward so that the lower end 138 extends between the upper portion 48 and the lower portion 122. In certain embodiments, a wheel 142 may be coupled to each lower end 138 in a position that is proximate the track 104. In these embodiments, the track 104 may be extended forward so that the forward end 110 is substantially aligned with the forward end 90 of the track 88 and/or track 126 and is positioned in closer proximity to the track 88 and/or track 126 than the more aft portions of the track 104 (i.e., the height of the aperture 120 is smaller in the forward end 110). Because the wheels 142 are coupled to the lower ends 138 in a location that is forward of the location where the wheels 102 are coupled to the projections 22, the wheels 142 are positioned adjacent the raised forward end 110, while the wheels 142 remain on the lower aft portions of the track 104 in the bed position. As a result the shape of the forward end 110 of the track 104 causes the projections 136 to pivot the seat back 14 into the bed position.

In some embodiments, the forward portion 44 of each support and the lower end 70 of each extension component may be coupled to a seat track fitting 112. The seat track fittings 112 may in turn be mounted to a floor of a vehicle via a track or may be welded, integrally formed, or otherwise joined to the floor via mechanical fasteners, such as bolts, rivets, screws, or other suitable fasteners.

To transition the seat 10 from a sitting position to the bed position, the passenger releases the actuating mechanism 80, which in turn allows the extension component 66 to collapse to the minimum height. Via separate operation or through the same control mechanism, the motor 100 begins to rotate the axle 96 in a forward direction, which in turn causes the sprockets 92 and/or sprockets 140 to travel in a forward direction down the track 88 and/or track 126 (and the wheels 102 and/or wheels 142 to travel in a forward direction down the track 104) until reaching a forward position, corresponding to the forward end 90 of the track 88 and/or track 126 (and the forward end 110 of the track 104). Via separate operation or through the same control mechanism, the seat back 14 rotates in an aft direction to a bed position. In some embodiments, it may be desirable to adjust the height of the rear leg 18 as desired while the seat 10 is otherwise in the bed position.

As shown in FIG. 4, the bed position of the seat back 14 is adjacent the upper portions 48 of the outer walls 42 of the supports 40. In certain embodiments, through the adjustments of these various components and through the shape of the supports 40 themselves, the seat pan 12 and the seat back 14 are positioned to form a substantially planar surface that forms approximately a 3 degree angle relative to the cable floor. However, as discussed above, one of ordinary skill in the relevant art will understand that any suitable angle may be used as needed depending on the particular aircraft and/or whether a level surface or a certain amount of incline is desired.

In an aircraft or other vehicle comprising a plurality of seats 10, the plurality of seats 10 may be arranged in rows of at least two seats 10 each with some seats 10 adjacent one or more aisles between the rows and other seats 10 not adjacent the aisle(s). An access path is needed for passengers seated in the non-aisle seats 10 to reach the aisle. When the seats 10 are in the sitting position, passengers are able to access the aisle via the space between the seat 10 and the next forward seat 10 (or a bulkhead). However, when the seats 10 are in the bed position, the space between each seat 10 and the next forward seat 10 (or the bulkhead) may be occupied by the forward-shifted seat pan 12. By configuring the bed position so that the seat 10 is lowered to a height that is proximate the vehicle floor, passengers seated in non-aisle seats 10 may access the aisle by stepping over the seats 10 in the bed position. Thus, by configuring the bed position to be proximate the vehicle floor, the space between the seat 10 and the next forward seat 10 (or bulkhead) may be utilized by the bed position of the seat pan 12 to provide a full flat bed, while still providing an access path for passengers to exit the row.

In certain embodiments, the lower frame 16 is configured so that the width of the lower frame 16 does not exceed the width of the seat back 14. In this configuration, the width of the passenger seat 10 may be maximized because the seat back 14 does not need to fit within the lower frame 16 in the bed position. Maximizing the seat back 14 width is possible when the lower frame 16 is configured to compress into a shape that may fit below the seat pan 12 and the seat back 14 in the bed position. In other embodiments, it may be desirable to configure the seat back 14 to retract within the lower frame 16.

To transition the seat 10 from the bed position to the sitting position, the passenger again releases the actuating mechanism 80, which in turn raises the extension component 66 to the maximum height. Via separate operation or through the same control mechanism, the motor 100 begins to rotate the axle 96 in an aft direction, which in turn causes the sprockets 92 and/or sprockets 140 to travel in an aft direction up the track 88 and/or track 126 (and the wheels 102 and/or wheels 142 to travel in an aft direction up the track 104) until reaching an aft position, corresponding to the aft end 98 of the track 88 and/or track 126 (and the aft end 108 of the track 104). Via separate operation or through the same control mechanism, the seat back 14 rotates to a sitting position, as illustrated in FIGS. 1-3. Other controls or stops may be engaged to prevent the seat back 14 from rotating to the bed position while the seat 10 is in the sitting position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising:
   (a) a lower frame comprising a pair of supports, and a rear leg comprising an extension component, wherein the extension component comprises at least two pair of segments pivotally coupled to one another in an accordion arrangement;
   (b) a seat pan adjustably coupled to the pair of supports via a coupling system; and
   (c) a seat back pivotally coupled to the seat pan;
   wherein the extension component is configured to adjust a height of the rear leg that in turn adjusts a height of the passenger seat between a sitting position and a bed position;
   wherein the sitting position comprises a raised position, wherein the seat pan is positioned above the lower frame, and the lower frame and the rear leg are extended to a maximum height so that the seat pan is approximately 15 inches to approximately 19 inches above a vehicle floor; and
   wherein the bed position comprises a lowered position, wherein the seat pan and the seat back are positioned to form a substantially planar and horizontal bed surface, the seat pan is positioned in front of the lower frame, and the lower frame and the rear leg are compressed to a minimum height that is overlapped by the seat back so that the bed surface is positioned proximate the vehicle floor.

2. The passenger seat of claim 1, wherein the bed surface is positioned to form approximately a 3 degree angle relative to the vehicle floor in the bed position.

3. The passenger seat of claim 1, wherein the coupling system comprises a pair of tracks positioned adjacent an upper portion of each support and a pair of projections extending from an aft end of the seat pan, each projection comprising a sprocket coupled to the corresponding track.

4. A passenger seat comprising:
   (a) a lower frame comprising a pair of supports, each support comprising a forward end and an aft end, and a rear leg comprising an extension component;
   (b) a seat pan comprising a pair of projections, wherein the pair of projections are coupled to the pair of supports via a coupling system comprising a pair of tracks positioned adjacent an upper portion of each support, and wherein each projection comprises a sprocket coupled to the corresponding track, wherein the coupling system is configured to allow the seat pan to translate between the forward end and the aft end of each support; and
   (c) a seat back pivotally coupled to the seat pan;
   wherein the extension component is configured to adjust a height of the rear leg that in turn adjusts a height of the passenger seat between a sitting position and a bed position,
   wherein the sitting position comprises a raised position, wherein the seat pan is positioned above the lower frame, and the lower frame and the rear leg are extended to a maximum height so that the seat pan is approximately 15 inches to approximately 19 inches above a vehicle floor; and
   wherein the bed position comprises a lowered position, wherein the seat pan and the seat back are positioned to form a substantially planar and horizontal bed surface, the seat pan is positioned in front of the lower frame, and the lower frame and the rear leg are compressed to a minimum height that is overlapped by the seat back so that the bed surface is positioned proximate the vehicle floor.

5. The passenger seat of claim 4, wherein the bed surface is positioned to form approximately a 3 degree angle relative to the vehicle floor in the bed position.

6. The passenger seat of claim 4, wherein the extension component comprises at least two pair of segments pivotally coupled to one another in an accordion arrangement.

7. A method of adjusting a passenger seat from a sitting position into a bed position, the passenger seat comprising a seat pan adjustably coupled to a lower frame, a seat back pivotally coupled to the seat pan, and a rear leg coupled to the lower frame, wherein the seat pan further comprises a pair of projections, each projection comprising a sprocket, and the lower frame further comprises a pair of supports, an upper portion of each support comprising a track, wherein the sitting position comprises a raised position, wherein the seat pan is positioned above the lower frame, and the lower frame and the rear leg are extended to a maximum height so that the seat pan is approximately 15 inches to approximately 19 inches above a vehicle floor, the method comprising:
   (a) compressing the lower frame and the rear leg to minimum height;
   (b) adjusting the seat pan into a position in front of the lower frame; and
   (c) reclining the seat back until the seat back forms a substantially planar and horizontal bed surface with the seat pan, and the lower frame and the rear leg are overlapped by the seat back so that the bed surface is positioned proximate the vehicle floor.

8. The method of claim 7, wherein the bed surface is positioned to form approximately a 3 degree angle relative to the vehicle floor in the bed position.

9. The method of claim 7, wherein the rear leg comprises at least two pair of segments pivotally coupled to one another in an accordion arrangement.

10. The method of claim 7, wherein a width of the lower frame does not extend past a width of the seat back.

11. An aircraft comprising a plurality of passenger seats, wherein each passenger seat comprises a lower frame comprising a pair of supports, an upper portion of each support comprising a track, a seat pan comprising a pair of projections, each projection comprising a sprocket coupled to the corresponding track, a seat back pivotally coupled to the seat pan, and an extension component coupled to the lower frame that adjusts a height of the passenger seat between a sitting position and a bed position,
   wherein the sitting position comprises a raised position, wherein the seat pan is positioned above the lower frame, and the lower frame and the extension component are extended to a maximum height so that the seat pan is approximately 15 inches to approximately 19 inches above a vehicle floor; and
   wherein the bed position comprises a lowered position, wherein the seat pan and the seat back are positioned to form a substantially planar and horizontal bed surface, the seat pan is positioned in front of the lower frame, and the lower frame and the extension component are compressed to a minimum height that is overlapped by the seat back so that the bed surface is positioned proximate the vehicle floor.

12. The aircraft of claim 11, wherein the plurality of passenger seats are arranged in rows of at least two seats, wherein at least one seat in the row is adjacent an aisle and at least one seat in the row is not adjacent the aisle, and wherein a passenger seated in the at least one seat not adjacent the aisle accesses the aisle by stepping over the bed surface of the at least one seat adjacent the aisle in the bed position.

* * * * *